(12) United States Patent
Sheffield, Jr.

(10) Patent No.: US 8,812,901 B2
(45) Date of Patent: Aug. 19, 2014

(54) METHODS AND APPARATUS FOR MARKING WRITES ON A WRITE-PROTECTED FAILED DEVICE TO AVOID READING STALE DATA IN A RAID STORAGE SYSTEM

(75) Inventor: Robert L. Sheffield, Jr., Longmont, CO (US)

(73) Assignee: LSI Corporation, Milpitas, CA (US)

( * ) Notice: Subject to any disclaimer, the term of this patent is extended or adjusted under 35 U.S.C. 154(b) by 314 days.

(21) Appl. No.: 13/241,711

(22) Filed: Sep. 23, 2011

(65) Prior Publication Data

US 2013/0080828 A1    Mar. 28, 2013

(51) Int. Cl.
*G06F 11/07* (2006.01)
(52) U.S. Cl.
USPC .................................. 714/6.22; 714/6.2
(58) Field of Classification Search
USPC .................................................. 714/6.2, 6.22
See application file for complete search history.

(56) References Cited

U.S. PATENT DOCUMENTS

| | | | | |
|---|---|---|---|---|
| 2002/0124145 A1* | 9/2002 | Arimilli et al. | ............... | 711/146 |
| 2004/0123032 A1* | 6/2004 | Talagala et al. | ............... | 711/114 |
| 2006/0041793 A1* | 2/2006 | Cherian et al. | .................. | 714/47 |
| 2006/0168192 A1* | 7/2006 | Sharma et al. | ................ | 709/224 |
| 2006/0271734 A1* | 11/2006 | Strange et al. | ................ | 711/114 |
| 2007/0079170 A1* | 4/2007 | Zimmer et al. | ................... | 714/6 |
| 2008/0010507 A1* | 1/2008 | Vingralek | .......................... | 714/7 |
| 2009/0112921 A1* | 4/2009 | Oliveira et al. | ............ | 707/103 R |
| 2009/0228648 A1* | 9/2009 | Wack | .............................. | 711/114 |
| 2010/0095060 A1* | 4/2010 | Strange et al. | ................. | 711/114 |
| 2010/0169571 A1* | 7/2010 | Kamalavannan et al. | .... | 711/114 |
| 2011/0208933 A1* | 8/2011 | Selfin et al. | ..................... | 711/162 |
| 2011/0219032 A1* | 9/2011 | Oliveira et al. | ............... | 707/770 |
| 2011/0225347 A1* | 9/2011 | Goss et al. | ..................... | 711/103 |
| 2012/0239860 A1* | 9/2012 | Atkisson et al. | .............. | 711/103 |
| 2013/0031425 A1* | 1/2013 | Vingralek | ..................... | 714/47.3 |

OTHER PUBLICATIONS

Elliott et al., "07-200r0 SAT-2 Write Long to Write Uncorrectable Ext", Apr. 26, 2007, Hewlett Packard.*
Gerry Houlder, "SBC-3 Add rebuild assist feature," Jun. 30, 2011, SBC-3 rev. 27,Document T10/11-298 rev. 0.

* cited by examiner

*Primary Examiner* — Chae Ko
(74) *Attorney, Agent, or Firm* — Duft Bornsen & Fettig (57) ABSTRACT

Methods and apparatus for improved building of a hot spare storage device in a RAID storage system while avoiding reading of stale data from a failed storage device. In the recovery mode of the failed device, all data is write protected on the failed device. A RAID storage controller may copy as much readable data as possible from the failed device to the hot spare storage device. Unreadable data may be rebuilt using redundant information of the logical volume. Write requests directed to the failed device cause the addressed logical block address (LBA) to be marked as storing stale data. When a read request is directed to such a marked LBA, the read request returns an error status from the failed device to indicate that the data is stale. The RAID controller then rebuilds the now stale data for that LBA from redundant information of the logical volume.

17 Claims, 5 Drawing Sheets

METHODS AND APPARATUS FOR MARKING WRITES ON A WRITE-PROTECTED FAILED DEVICE TO AVOID READING STALE DATA IN A RAID STORAGE SYSTEM

BACKGROUND

1. Field of the Invention

The invention relates generally to storage systems and more specifically relates to methods and structure in a storage device for assuring that stale data on a storage device that is write-protected cannot be read by a controller in a RAID storage system.

2. Discussion of Related Art

In RAID (Redundant Array of Independent Drives) storage systems, logical volumes are defined and managed. A logical volume comprises portions of two or more disk drives and stores redundancy information along with user data provided by attached host systems. The redundancy information is generated and stored in conjunction with user data such that failure of a single disk drive does not preclude ongoing access to the data on the logical volume. Rather, the logical volume may continue operation until such time as the failed drive is replaced and the full redundancy features are restored (i.e., a "rebuild" operation onto a "hot swap" disk drive).

Various "levels" of RAID storage management are standardized in the storage industry. In RAID level 1 management, user data on one storage device is mirrored on a second storage device. In RAID level 5, user data and redundancy information is distributed ("striped") over a plurality of storage devices (at least 3 devices). In RAID level 5, the redundancy information is the exclusive-OR ("XOR") sum of the user data. Thus, a "stripe" of data in RAID level 5 management includes a plurality of blocks of user data and a corresponding parity block that is the XOR sum of the user data in the related blocks of the stripe. In like manner, RAID level 6 defines a stripe of data as a plurality of blocks of user data and two blocks of redundancy information—typically a first parity block that is the XOR sum or the other blocks and a second block that may be also XOR parity, Galois field accumulation (also referred to as Galois field multiplication or "GFM"), or other redundancy computations. RAID level 6 can therefore keep a logical volume operating even in the event of two disk drive failures of the logical volume.

Modern storage devices (e.g., rotating disk drives) sense present failures of the device and may include logic to sense a potential impending failure before the device actually fails. As used herein, "failing" device and "failed" device refer to such a storage device that has either sensed a current failure or has sensed a possible impending failure. In such a state, in some embodiments, the storage device may remain able to read significant portions of stored data for a period of time (if not all stored data) before the device ultimately fails. For example, a common failure mode of multi-head, rotating disk drives is the total failure of one of the multiple read/write heads. If, for example, a drive has 4 heads and a single head has failed, then 75% of the data is still accessible through the remaining three good heads. In this scenario, a failing device may be programmed/configured into a special recovery mode in which any data that is accessible without error can be read but no data can be written (i.e., the storage device is, in effect, in a write-protected mode). Using the recovery mode, much if not all data on the failing device may be copied to a substitute device before the device fails further (or actually fails in devices that may sense impending failure). This copying to a replacement (hot swap) device may dramatically reduce the time required to restore a volume to normal operation as compared to a full rebuild process because only those portions that could not be read from the failing device need to be rebuilt using the redundancy information.

Some storage device manufacturers have proposed and implemented related features in storage devices in what is sometimes referred to as a "rebuild assist mode". In this mode, the failing device is operable to reconfigure itself to write protect data and to reconfigure itself to quickly detect a likely failed block on read requests (i.e., without extensive retries of the potential read failure). The rapid read failure detection helps reduce the overhead latency time associated with normal read operation of the storage device internally retrying read failures of a block. Using the rapid read failure detection, a copy process may more rapidly copy all readable data from the failing device onto a hot swap spare storage device. In this rebuild assist mode, the failing device processes read requests from attached system essentially normally (but with minimal retry logic employed) for all readable data blocks to be copied to the hot swap replacement storage device. The storage device is further operated in this rebuild assist mode such that the data is write protected. The logical volume that comprises the failing device may continue to operate essentially normally processing read requests and copying data to the hot swap device in the background until a write request is attempted. A write request directed to the logical volume will fail with respect to the data to be written to the failing device (since it is write protected in the rebuild assist mode) but, in some embodiments, may succeed with respect to other blocks of the stripe written to other storage devices of the logical volume.

When the write operation to the failing device in recovery mode fails, the data presently stored at the logical block address that failed on the failing device may still be readable but the data is not up to date with respect to other data of the related RAID stripe (or with respect to the mirrored data in the case of RAID level 1 management). Such data is typically referred to as "stale" data. In present devices that use such a recovery mode to read data from a failing device, a write failure may force a complete rebuild of the hot swap device to avoid the use of stale data rather than rely on the faster recovery mode to read all data from the device sensing failure. A full rebuild can be extremely time consuming in present day high capacity storage devices. Further, it is impractical for a RAID controller coupled with a failed storage device to maintain a log of writes attempted to the failed device—especially during the extensive time required to rebuild a hot spare device to replace the failed device. A RAID storage controller may manage many such devices. The memory required on the RAID controller to log attempted writes to a failed storage device for an extended period of time could be very large even for a single failed device let alone multiple failed devices of the tens or hundreds of devices potentially managed by a high-end RAID storage controller.

Thus it is an ongoing challenge to efficiently manage sensing of failure of the storage device and resultant processing to build an up to date spare storage device to replace the failing device.

SUMMARY

The present invention solves the above and other problems, thereby advancing the state of the useful arts, by providing methods and apparatus for improved building of a hot spare storage device in a RAID storage system while avoiding reading of stale data from the failed storage device. The failed device enters a recovery mode of operation in response to sensing its failure (or impending failure). In the recovery mode, all data is write protected on the failed device. A RAID storage controller may copy as much readable data as possible from the failed device to the hot spare storage device. Unreadable data may be rebuilt by the RAID controller using redundant information of the logical volume that comprises the failed device. Write requests directed to the failed device cause the addressed logical block address (LBA) to be marked within the device as storing stale data. When a read request is directed to such a marked LBA, the read request returns an error status from the failed device to indicate that the data is stale. The RAID controller then rebuilds the now stale data for that LBA from redundant information of the logical volume while continuing to copy any remaining readable data from the failed device to the hot spare device.

In one aspect hereof, a method operable within a storage device is provided. The storage device is adapted to couple with a Redundant Array of Independent Drives (RAID) storage controller. The method comprises detecting a failure of the storage device and automatically reconfiguring the storage device into a recovery mode of operation in response to sensing the failure. Responsive to entering the recovery mode, the method further comprises receiving a write request to store supplied data at a write logical block address (LBA) and marking the write LBA as storing stale data in response to receipt of the write request. In the recovery mode, the method also comprises receiving a read request requesting return of identified data stored at a read LBA and determining whether the read LBA is marked as storing stale data responsive to receipt of the read request. The method then further comprises completing the read request by returning the identified data stored at the read LBA in response to a determination that the read LBA is not storing stale data and failing the read request in response to a determination that the read LBA is marked as storing stale data.

Another aspect hereof provides apparatus in an enhanced storage device and a RAID storage system comprising a drive so enhanced. The apparatus comprises a failure detector adapted to sense failure of the storage device and adapted to reconfigure the storage device into a recovery mode of operation. The apparatus further comprises a recovery mode write request processor adapted to process a write request received by the storage device while the storage device is in recovery mode. The write request identifying a write logical block address (LBA) to be written with supplied data. The recovery write request processor is further adapted to mark the write LBA as storing stale data in response to receipt of the write request. The apparatus further comprises a recovery mode read request processor adapted to process a read request received by the storage device while the storage device is in recovery mode. The read request identifying a read LBA to be read. The recovery read processor is further adapted to determine whether the read LBA is marked as storing stale data. The recovery read processor is further adapted to complete the read request by returning requested data in response to a determination that the read LBA is not marked as storing stale data and to complete the read request with a status indicating stale data in response to a determination that the read LBA is marked as storing stale data.

DETAILED DESCRIPTION OF THE DRAWINGS

Figure 1:
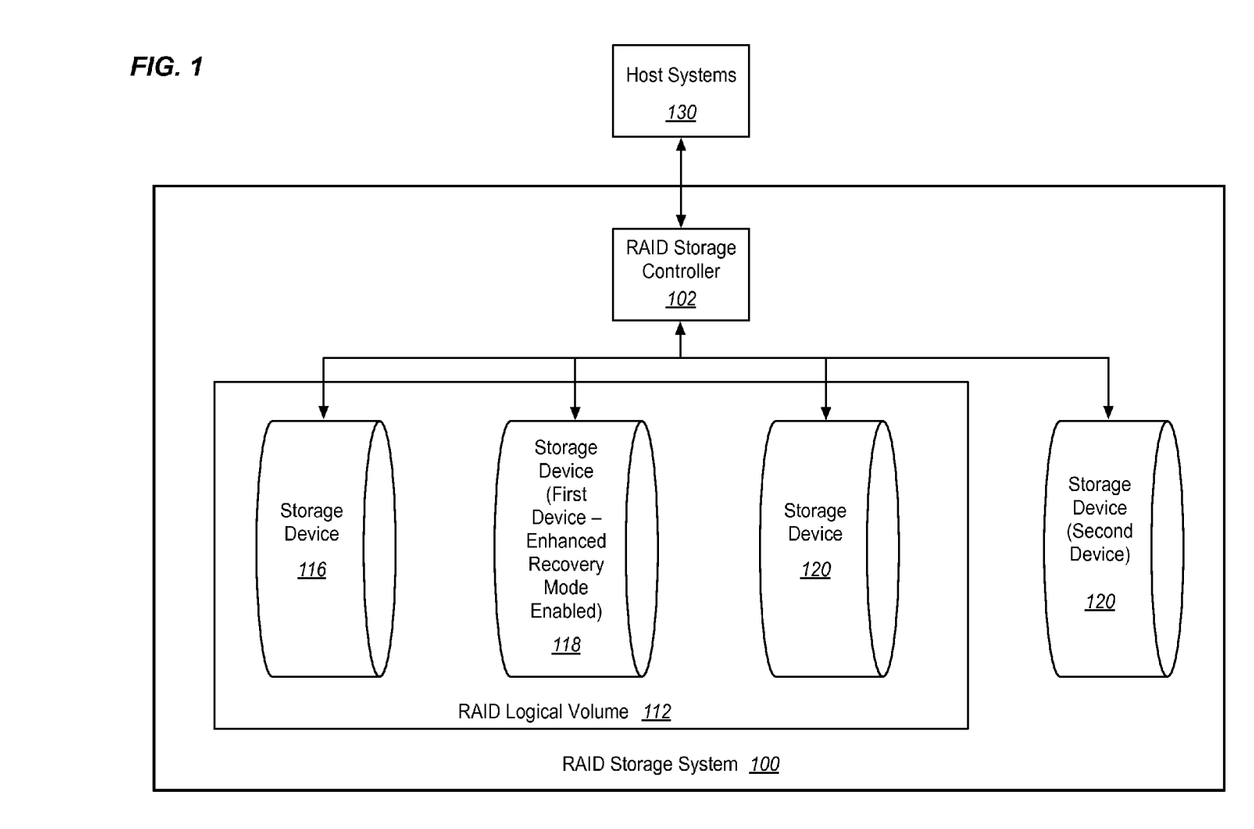
FIG. 1 is a block diagram of an exemplary RAID storage system adapted to utilize capabilities of an enhanced recovery mode storage device in accordance with features and aspects hereof.

FIG. 1 is a block diagram of an exemplary RAID storage system 100 enhanced in accordance with features and aspects hereof to utilize enhanced recovery mode features of a storage device. System 100 comprises RAID storage controller 102 adapted to couple with one or more host systems 130. Controller 102 may comprise any suitable computing and/or or electronic devices programmed or designed to receive I/O requests from attached host system 130 and to process the request by accessing RAID logical volume 112 of system 100. Controller 102 may be coupled with host systems 130 by any suitable communication media and protocol including, for example, Ethernet, Serial Attached SCSI (SAS), Serial Advanced Technology Attachment (SATA), Fibre Channel (FC), etc. RAID logical volume 112 is defined and managed by controller 102 and comprises portions of each of a plurality of storage devices (116, 118, and 120). Storage devices 116, 118, and 120 may be any suitable storage devices including, for example, optical or magnetic rotating disk drive, solid-state drives, etc. Further the storage devices may couple with storage controller 102 using any of several well-known commercially available media and protocols, including, for example, SAS, SATA, FC, etc.

Portions of the storage devices are utilized for physically storing information as controller 102 manages the plurality of storage devices in accordance with one of a variety of RAID management levels. For example, two or more storage devices may be managed as a logical volume in accordance with RAID level 1 management (i.e., mirroring or duplicating data from the first storage device to one or more mirrored storage devices). Or, for example, three or more storage devices may be managed in accordance with RAID level 5 management (i.e., the striping/distributing of data and associated XOR parity over the plurality of storage devices). Still further, logical volume 112 may be managed as a RAID level 6 volume (i.e., striping data and associated multiple redundancy blocks over the plurality of storage devices).

As shown in FIG. 1, logical volume 112 comprises storage devices 116, 118, and 120 though as noted above, any suitable number of storage devices may be configured as a logical volume). At least one of the storage devices that comprise logical volume 112 (e.g., first device 118) provides enhanced recovery mode capabilities in accordance with features and aspects hereof. As more specifically detailed herein below, first storage device 118 provides enhanced recovery mode features that preclude undetectable use of stale data when attempting to recover data from device 118 in response to sensing failure of device 118. Storage system 100 further comprises an additional storage device (e.g., second device 120) used as a hot spare replacement storage device when recovering data from failed first device 118.

In operation, first storage device 118 is adapted to sense its own failure and to generate a failure signal indicative of such a failure. The information identifying the failed status is then returned to storage controller 102. Responsive to sensing its own failure, first storage device 118 reconfigures itself into a recovery mode of operation. In the recovery mode of operation, first storage device 118 write protects the data stored therein and also reconfigures its read retry logic to more rapidly detect failure of the device to read data from an identified logical block address. As further detailed herein below, a write request directed from controller 102 to first device 118 while in its recovery mode causes first device 118 to mark the logical block intended to be written as storing stale data. Thus, subsequent attempts to read the identified data (e.g., when copying the data to second storage device 120) will identify the data as stale data thus allowing controller 102 to rebuild or reconstruct the stale data from redundant information in the other storage devices (116 and 120) of logical volume 112.

More specifically with regard to operation of system 100 and more particularly operation of controller 102, responsive to sensing the failure of first device 118, controller 102 initiates a sequence of read and write operations to copy as much readable data as possible from failed first device 118 to hot spare replacement second storage device 120. Each such read operation directed to failed first device 118 either completes with successful read data returned or completes with a failure status indicating the presence of stale data in the identified logical block address (or other failure status information). Responsive to return of successful read data, controller 102 copies or writes the returned data to the same logical block address on hot spare replacement second storage device 120. Responsive to return of a failure status indicating the presence of stale data (or other failure status information), controller 102 reconstructs or rebuilds the data for the LBA from redundant information on other storage devices (116 and 120) of the logical volume 112 (based on the RAID management level applied) and writes the reconstructed data to the same logical block address of hot spare replacement second storage device 120.

Utilizing this enhanced recovery operation of system 100, as much data as possible may be copied from failed first storage device 118 to hot spare replacement second storage device 120. Thus, system 100 obviates the need for very large non-volatile memory on RAID storage controller 102 to log information that is stale on a failed device when attempting to reduce the time for initializing a spare device. Further, the enhancements of system 100 avoid costly, time-consuming RAID rebuild processing for the entirety of hot spare second storage device 120 in favor of copying as much readable data as possible from failed first device 118 while assuring that no stale data is copied to the spare device. The time required to completely restore data to hot spare second storage device 120 is thereby dramatically reduced as compared to prior techniques that forced a total rebuild operation from redundant information of logical volume 112 to assure that stale data is never copied from failed first device 118 to hot spare second device 120.

Those of ordinary skill in the art will readily recognize that any number of storage devices may comprise logical volume 112 and further will readily recognize any number of such logical volumes may be present and managed within system 100 by operation of controller 102. Further, any number of additional hot spare storage devices may be present in system 100. Still further, those of ordinary skill in the art will readily recognize numerous additional and equivalent elements present in a fully functional system 100 and more specifically in a fully functional controller 102. Such additional and equivalent elements will be readily apparent to those of ordinary skill in the art and are omitted herein for simplicity and brevity of this discussion.

Figure 2:
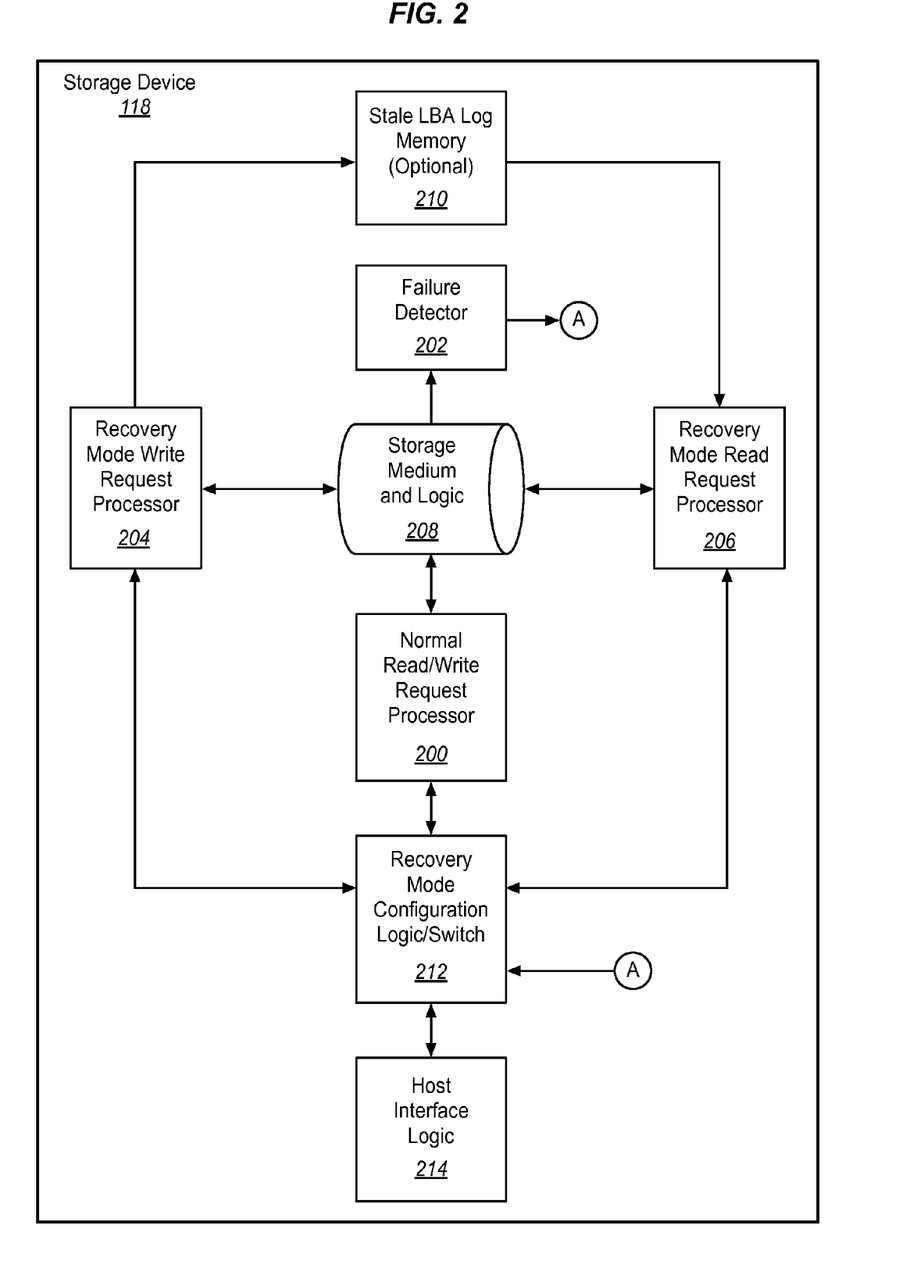
FIG. 2 is a block diagram of an exemplary storage device providing enhanced recovery mode capabilities in accordance with features and aspects hereof.

FIG. 2 is a block diagram providing exemplary additional details of the structure of first storage device 118 of FIG. 1 providing an enhanced recovery mode of operation. Device 118 includes storage medium and logic 208 representing any suitable components for persistently storing and retrieving data along with any associated logic such as read/write channel logic, servo and motor control logic, head positioning actuator logic etc. Read and write requests are processed by appropriate processors of storage device 118 by writing data to storage medium 208 using associated logic and by reading data previously stored on storage medium 208 using associated logic.

Enhanced storage device 118 includes failure detector 202 adapted to detect a present or impending failure mode of the storage device. Details of operation of such a detector and the types of failures detected are well-known to those of ordinary skill in the art. Detector 202 generates a failure signal (label "A") applied to recovery mode configuration logic/switch 212. The failure signal is used therein for reconfiguring storage device 118 to operate in a recovery mode (as opposed to a normal operating mode.). Host interface logic 214 of storage device 118 receives I/O requests from an attached host device (e.g., a RAID storage controller or other suitable controlling components). Received read and write requests are applied by host interface logic 214 to recovery mode configuration logic/switch 212 to be routed either to normal read/write request processor 200 or to either recovery mode write request processor 204 or recovery mode read request processor 206. Normal read/write request processor 200 represents any suitable logic for processing received read or write requests when storage device 118 is operating in a normal mode (i.e., not in the recovery mode of operation). Design and details of operation of normal read/write request processor 200 are well-known to those of ordinary skill in the art. When storage device 118 is operating in recovery mode, logic/switch 212 instead routes incoming write requests to recovery mode write request processor 204 and routes incoming read request to recovery mode read request processor 206. In like manner, information returning from request processors 200, 204, and 206 is applied to logic/switch 212 to be returned to an attached host or controller via host interface logic 214.

In recovery mode operation, recovery mode write request processor is adapted to mark the logical block addressing identified by a received write request (i.e., the write LBA) as storing stale data. Thus, any subsequent read request to access the LBA marked as storing stale data (i.e., the write LBA) will return status indicating that the data at the requested read LBA has been marked as stale. Return of such a stale data status helps avoid erroneous use of stale data that was to be written by a write request received from an attached host or controller device but failed. Further, in recovery mode of operation, recovery mode read request processor 206 is adapted to determine whether an identified read LBA specified by a received read request has been marked as stale data. Responsive to a determination that the read LBA has been marked as stale, recovery mode read request processor 206 returns an appropriate status indicating that the requested read LBA contains stale data (or other error status that precludes use of the data). Responsive to a determination that the read LBA has not been marked as stale, recovery mode read request processor 206 processes the read request normally and returns the requested data from the identified read LBA.

In some exemplary embodiments, recovery mode write request processor 204 is adapted to mark the write LBA as storing stale data by forcing the writing of uncorrectable data at the location specified by the write LBA of the write request. A variety of techniques will be readily apparent to those of ordinary skill in the art to force the writing of uncorrectable data at the location specified by the write LBA. For example, the SCSI standard for SCSI block commands (SBC) provides for a WRITE_LONG command that includes parameter bits for WR_UNCOR and COR_DIS to specify that data is to be written in an identified block that is intentionally forced to be uncorrectable. Other equivalent techniques to force the writing of uncorrectable data will be apparent to those of ordinary skill in the art. Forcing the data at an identified write LBA to be uncorrectable may be used as a flag for subsequent read requests to identify that the data contained at an identified read LBA is stale or otherwise unusable.

In such embodiments marking the stale data in an LBA by writing uncorrectable data therein, any attempt to read that data in processing a host request or in the copy function copying all readable data from the failed device to the spare device will fail. Thus, stale data will not be used by the host system or by the function to copy data to the spare device.

In other exemplary embodiments recovery mode write request processor 204 may add information to a log memory 210 adapted to store such logged information identifying LBAs known to have stale data. Log memory 210 may be any suitable read/write memory component including, for example, DRAM, nonvolatile RAM, flash memory, etc. Further, log memory 210 may be stored in a reserved portion of medium 208 that is known to be still usable. For example, if one of multiple heads/surfaces of the storage device fails (i.e., where the storage device medium is a rotating magnetic or optical disk drive), log memory 210 may be stored in a reserved area of one of the remaining functioning heads/surfaces. Regardless of where log memory 210 is stored, the log information may comprise any of a number of possible structures. For example, log memory may comprise a bitmap where each bit corresponds to one or more logical block addresses of the storage medium 208 (e.g., a "partition", "chunk", or "cluster" of LBAs). The bit corresponding to an addressed LBA may be set to indicate that the data stored therein is stale. Where the bit represents multiple LBAs, the bit is set if any of the represented LBAs are known to have stale data. Or, for example, log memory 210 may comprise a growing list of entries where each entry comprises data indicating a starting LBA and an extent of consecutive LBAs that are known to store stale data.

In such embodiments using log memory 210, recovery mode write request processor 204 adds information regarding the attempted write operation to log memory 210 in response to each write request received while storage device 118 is operating in the recovery mode. Further, in such embodiments, recovery mode read request processor 206 inspects information in log memory 210 responsive to receipt of a read request to determine if the read LBA identified by the received read request has been entered in information of log memory 210 as indicative of the presence of stale data. If recovery mode read request processor 206 finds such stale data information in log memory 210, processor 206 completes the read request by returning a status code indicating that the requested read LBA contains stale data. If no such stale data information is found in memory 210 for the read LBA by operation of processor 206 when processing a read request, the read request is completed normally returning the requested data to the attached host or controller device.

Numerous other techniques will be apparent to those of ordinary skill in the art to mark data attempted to be written to the failed device as stale.

Those of ordinary skill in the art will readily recognize that request processors 200, 204, and 206, failure detector 202, and the routing of I/O request performed by logic/switch 212 and host interface logic 214, may be implemented as suitably designed custom circuits or as suitably programmed instructions executed by one or more general or special purpose programmable processor within the controller device of storage device 118. In particular, logic/switch 212 represents any suitable logic for setting a recovery mode of operation of the storage device 118, for appropriately routing I/O requests for normal processing by processor 200 when not operating in recovery mode, and for routing requests through processors 204 or 206 when operating in a recovery mode. In a preferred embodiment the above identified elements are implemented as suitably programmed instructions stored in a suitable program memory and executed by an appropriate processor of storage device 118. Those of ordinary skill in the art will further readily recognize numerous additional and equivalent components present in a fully functional storage device 118. Such additional and equivalent components are omitted herein for simplicity and brevity of this discussion.

Figure 3:
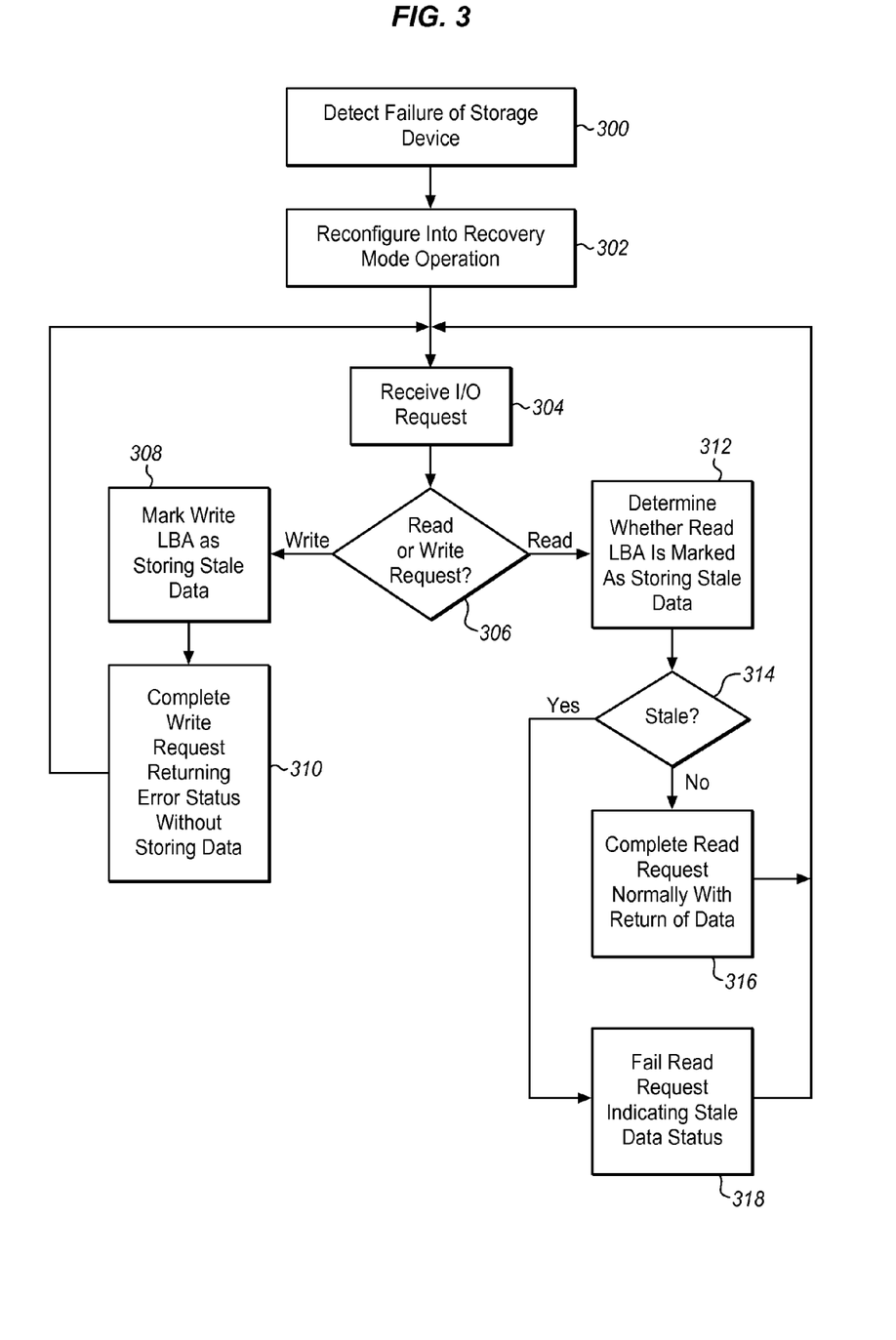
FIGS. 3 through 5 are flowcharts describing exemplary methods in accordance with features and aspects hereof to improve recovery of data from an enhanced recovery mode storage device in accordance with features and aspects hereof.

FIG. 3 is a flowchart describing an exemplary method operable within an enhanced storage device such as storage device 118 described above with respect to FIGS. 1 and 2. At step 300, the storage device detects failure or an impending failure of components of the storage device that already have or may soon render some data unreadable. Those of ordinary skill in the art will readily recognize a variety of types of failures that may be detected and appropriate circuits and/or program logic to sense the various types of failures. Responsive to such detection, at step 302, the storage device reconfigures itself into a recovery mode of operation. While in recovery mode, steps 304 through 318 are operable to process received read and write I/0 requests. At step 304, a next I/O request is received. Step 306 determines whether the received request is a read request identifying a read LBA to be accessed or a write request identifying a write LBA to be written. Responsive to receipt of a write request, step 308 marks the identified write LBA as storing stale data. In some embodiments, the write LBA may be marked as storing stale data by forcing the write of uncorrectable data at the identified write LBA. As noted above, one approach for forcing the write of uncorrectable data is to process the received write request as though it is a SCSI WRITE_LONG command having appropriate parameter bits set to force the writing of uncorrectable data. Another exemplary approach for marking the write LBA as storing stale data is to enter information in a log memory associated with the storage device that identifies the write LBA as containing stale data.

After marking the write LBA, step 310 next completes the write request returning an appropriate status code to the requesting host or controller indicating that the write operation has failed. The data to be written supplied with the write request is not stored in the identified write LBA and hence the requested write LBA has been marked as containing stale data. Processing then continues awaiting receipt of a next I/O request at step 304.

If step 306 determines that the received I/O request is a read request, step 312 next determines whether the read LBA supplied in the received read request has been marked as containing stale data. As noted above, and LBA may be marked by processing of a previous write request while in recovery mode. Where the LBA is marked by the write request forcing the write of uncorrectable data, step 312 determines that the read LBA stores stale data by actually reading the specified read LBA and sensing the presence of uncorrectable data at that location. Where the LBA is marked by the write request processor logging information in a log memory, step 312 identifies the read LBA as storing stale data by locating an entry in the log memory identifying the read LBA as previously marked for storing stale data. Step 314 then determines the result of the determination of step 312. If the read LBA has been determined not to store stale data, step 316 completes the read request normally by returning the requested data to the requesting host or controller. If the read LBA has been determined to store stale data, step 318 completes the read request by failing the read request returning an appropriate status indicating the presence of stale data in the identified read LBA. Processing continues awaiting receipt of the next I/O request at step 304.

Thus, the method of FIG. 3, operable in an enhanced recovery mode storage device, assures that stale data cannot be unintentionally utilized in the process of building a hot spare to replace the failed storage device. Any attempt to read data from the failed storage device where a previous attempt had been made to overwrite the data while the storage device is in recovery mode will result in a failure of the read request forcing the attached host or controller to take appropriate remedial action in building that portion of the replacement hot spare storage device. Otherwise, portions that are still readable from the failed storage device may be read and copied to the hot spare replacement storage device.

Figure 4:
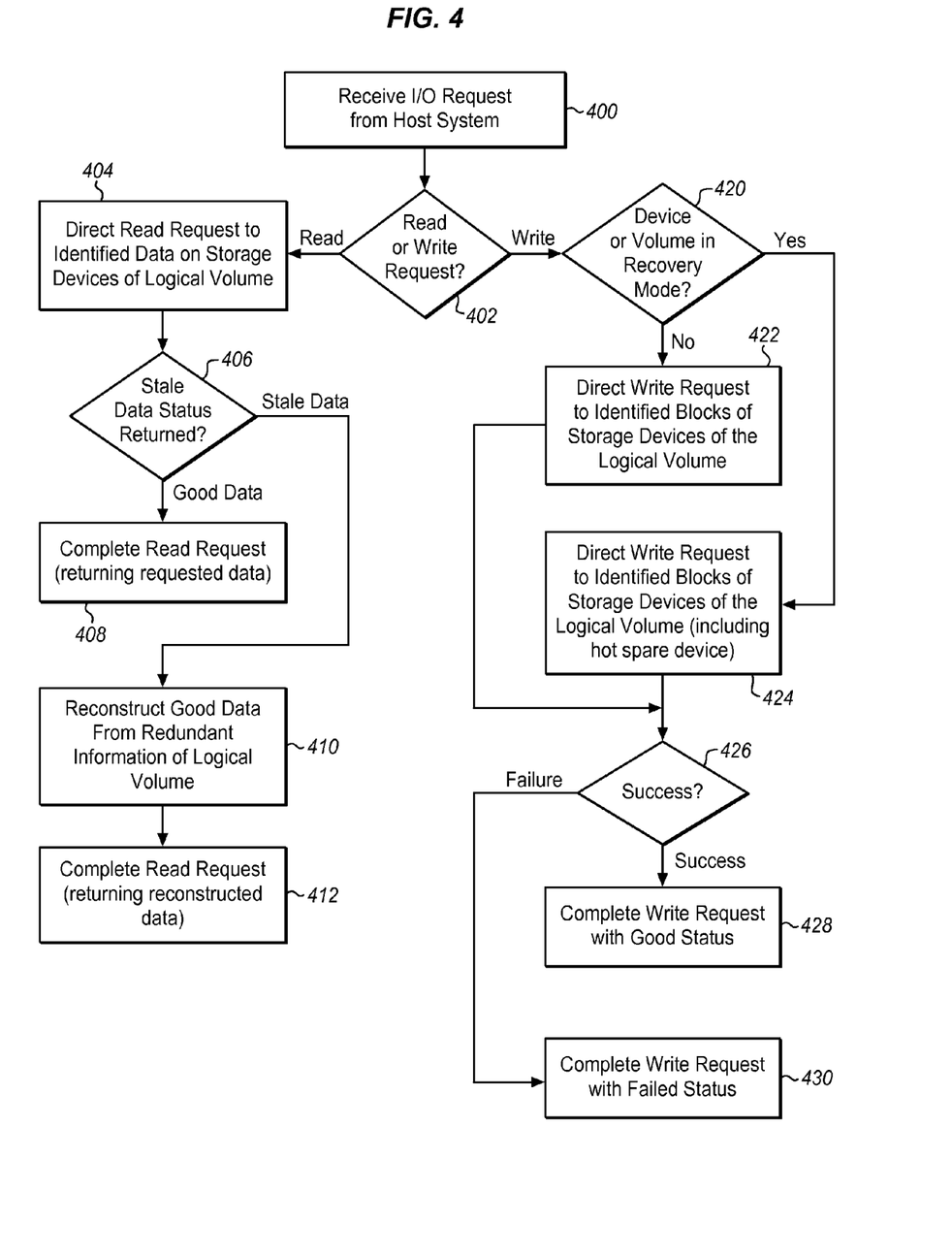

The above identified enhanced recovery mode features of the storage device are useful to a RAID storage controller building the content of a hot spare storage device to replace the failed storage device. As noted above, the enhanced recovery mode allows a host or storage controller coupled to the failed storage device to read as much data as possible from the failed storage device for purposes of directly copying the data to the hot spare storage device. Such a bulk copy of readable data from the failed storage device to the hot spare replacement storage device helps reduce the time required to rebuild blocks of data on the hot spare replacement storage device utilizing RAID redundancy information of the associate logical volume. Only those portions of the failed storage device that the storage controller finds to be unreadable when attempting to copy data from the failed device need to be rebuilt on the hot spare device utilizing RAID redundancy information of the logical volume. FIG. 4 is a flowchart describing an exemplary method of operation of a RAID storage controller coupled with an enhanced recovery mode storage device as described above with respect to FIGS. 1 through 3. The method of FIG. 4 may be operable, for example, in a RAID storage controller such as RAID storage controller 102 of FIG. 1 in conjunction with an enhanced recovery mode storage device such as storage device 118 of FIGS. 1 through 3. At step 400, the storage controller receives an I/O request from an attached host system. Step 402 determines whether the received request is a read request or a write request. Responsive to receipt of a read request, step 404 generates and directs appropriate read requests to retrieve identified data on the plurality of storage devices that comprise the logical volume. Step 406 determines whether the read operations completed normally returning good data or returned an error status indicating the presence of stale data at some identified read LBA on one of one or more of the storage devices of the logical volume. If the read operations all returned good data, step 408 completes the read request from the attached host system by returning the requested data. If the status of the read operations performed on the plurality of storage devices indicates stale data was located at the read LBA of one or more of the storage devices, step 410 reconstructs good data from the redundant information of the logical volume managed in accordance with RAID storage management. The missing data so reconstructed and any good data returned from the multiple read operations applied to the multiple storage devices is then returned to the requesting host system at step 412 to complete the read request.

If step 402 determines that the received request is a write request, steps 420 through 430 are operable to process the write request. Step 420 first determines whether the logical volume is operating in a degraded mode because of a failure of one (or more) of the storage devices that comprise the logical volume. If the logical volume is operating normally (i.e., none of the storage devices that comprise the logical volume are presently in a failed state or a recovery mode of operation), step 422 directs the write request/operations to identified blocks of the plurality of storage devices that comprise the logical volume. In accordance with standard RAID storage management, appropriate redundancy information will also be generated and written to appropriate locations of the logical volume by operation step 422. Processing and continues at step 426 as described herein below.

If the logical volume is operating in the degraded mode because one or more of the storage devices of the logical volume are operating in a failed or recovery mode, step 424 is operable to direct the write request/operations to appropriate identified blocks of the plurality of storage devices of the logical volume including writing data to a hot spare device being built from the data recoverable from the failed storage device. By writing data to the hot spare storage device being rebuilt to replace the corresponding failed storage device, information already copied from the failed storage device to the hot spare replacement storage device may be kept up-to-date and consistent with respect to RAID storage management techniques applied to the logical volume. Processing then continues at step 426 to determine whether the write operations succeeded or failed. If the write operations to the plurality of storage devices that comprise the logical volume all succeeded, including writes to the hot spare storage device, step 428 completes the write request by returning an appropriate good status to the requesting host system. If step 426 determines that one or more of the write operations to the plurality of storage devices failed, step 430 completes the write request by returning a failure status to the attached, requesting host system.

Figure 5:
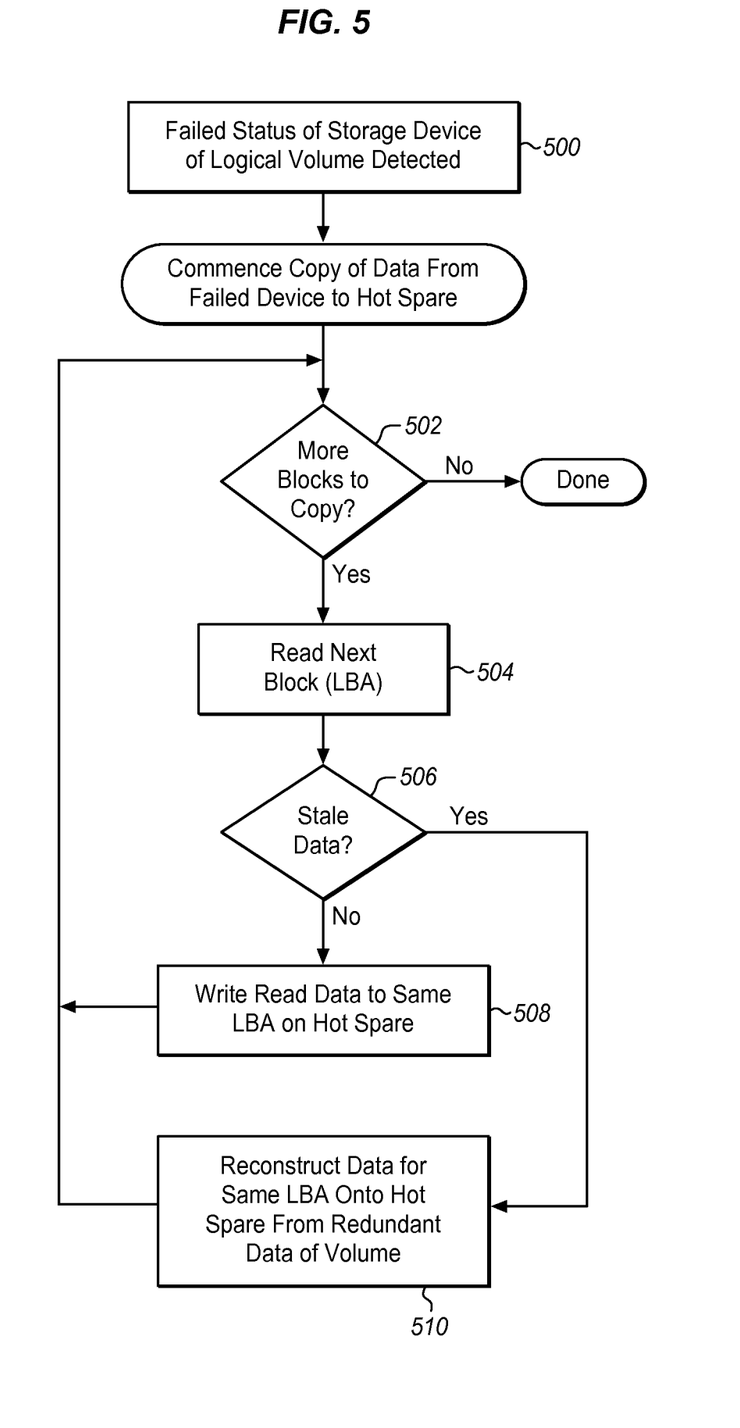

While FIG. 4 describes a method generally operable to process I/O requests within a RAID storage controller coupled with one or more enhanced recovery mode storage devices, FIG. 5 describes another exemplary method operable within such a storage controller to perform rebuild operations on a hot spare storage device intended to replace a failed storage device in the logical volume. As noted above, an enhanced recovery mode storage device allows as much data as possible to be read from the failed storage device thus permitting copying of data from the failed device to the hot spare replacement device in lieu of RAID storage management rebuild operations based on redundancy information of the logical volume. Only those portions that are unreadable from the failed storage device needs be need to be rebuilt through RAID storage management utilization of redundant information of the logical volume. At step 500, the RAID storage controller senses a failure status of one or more storage devices of the logical volume. Responsive to sensing such a failure, storage controller commences operations to build the hot spare storage device by copying as much data as possible from the failed device to the hot spare and rebuilding only those portions of the failed device that are unreadable using RAID redundancy information. Steps 502 through 510 are iteratively operable to perform the desired building of the hot spare storage device.

At step 502, it is determined whether additional blocks remain to be copied or rebuilt from the failed device to the hot spare replacement device. If no further data remains to be copied or rebuilt, the method completes and the replacement hot spare storage device is ready to be utilized replacing the failed device. If additional data remains to be copied, step 504 reads the next logical block from the failed storage device. Step 506 determines whether the attempted read succeeded or failed returning some error status code such as a stale data error status code. If the read succeeded, step 508 writes the returned read data to the same logical block address on the hot spare replacement storage device and processing continues looping back to step 502. If the attempted read returned an error status such as an indication of stale data being present at the addressed logical block, step 510 is operable to reconstruct data for the same logical block address on the hot spare replacement storage device based on the redundant data associated with this block address in the logical volume. The data so reconstructed is then written onto the hot spare replacement storage device and processing continues looping back to step 502 until all data has been copied or rebuilt from the failed device.

Those of ordinary skill in the art will readily recognize numerous additional and equivalent steps that may be present in the methods of FIGS. 3 through 5. Such additional and equivalent steps are omitted herein for simplicity and brevity of discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable within a storage device, the storage device adapted to couple with a Redundant Array of Independent Drives (RAID) storage controller, the method comprising:
   detecting a failure of the storage device;
   automatically reconfiguring the storage device into a recovery mode of operation in response to sensing the failure;
   responsive to entering the recovery mode, performing the steps of:
   receiving a write request to store supplied data at a write logical block address (LBA);
   marking the write LBA as storing stale data in response to receipt of the write request;
   receiving a read request requesting return of identified data stored at a read LBA;
   determining whether the read LBA is marked as storing stale data responsive to receipt of the read request;
   completing the read request by returning the identified data stored at the read LBA in response to a determination that the read LBA is not storing stale data; and
   failing the read request in response to a determination that the read LBA is marked as storing stale data.

2. The method of claim 1 further comprising:
   completing the write request by returning a failure status for the write request without storing the supplied data at the write LBA.

3. The method of claim 1
   wherein the step of failing the read request further comprises returning a status code indicating that the identified data is stale.

4. The method of claim 1
   wherein the step of marking further comprises writing uncorrectable data at the write LBA, and
   wherein the step of determining further comprises:
   attempting to read the identified data stored at the read LBA; and
   detecting the presence of uncorrectable data stored at the read LBA as indicative of the read LBA being marked as storing stale data.

5. The method of claim 4
   wherein the step of writing uncorrectable data further comprises:
   completing the write request as though it is a SCSI WRITE_LONG operation having WR_UNCOR and COR_DIS parameters bits set.

6. The method of claim 1
   wherein the step of marking further comprises adding information identifying the write LBA to a log memory of the storage device,
   wherein the step of determining further comprises:
   detecting that the read LBA matches information previously added to the log memory indicative that the read LBA stores stale data.

7. The method of claim 6
   wherein the log memory is a non-volatile memory.

8. Apparatus in a storage device, the apparatus comprising:
   a failure detector adapted to sense failure of the storage device and adapted to reconfigure the storage device into a recovery mode of operation;
   a recovery mode write request processor adapted to process a write request received by the storage device while the storage device is in recovery mode, the write request identifying a write logical block address (LBA) to be written with supplied data, the recovery write request processor adapted to mark the write LBA as storing stale data in response to receipt of the write request; and
   a recovery mode read request processor adapted to process a read request received by the storage device while the storage device is in recovery mode, the read request identifying a read LBA to be read, the recovery read processor adapted to determine whether the read LBA is marked as storing stale data, the recovery read processor further adapted to complete the read request by returning requested data in response to a determination that the read LBA is not marked as storing stale data, the recovery read request processor further adapted to complete the read request with a status indicating stale data in response to a determination that the read LBA is marked as storing stale data.

9. The apparatus of claim 8
   wherein the recovery mode write processor is further adapted to mark the write LBA as storing stale data by writing uncorrectable data at the write LBA, and
   wherein the recovery mode read processor is further adapted determine that the read LBA is marked as storing stale data by attempting to read the data stored at the read LBA and detecting the presence of uncorrectable data stored at the read LBA in response to the attempted read of the data.

10. The apparatus of claim 9
    wherein the recovery mode write request processor is further adapted to write uncorrectable data by processing the write request as though it is a SCSI WRITE_LONG operation having WR_UNCOR and COR_DIS parameter bits set.

11. The apparatus of claim 8 further comprising:

a log memory coupled with the recovery mode write request processor and coupled with the recovery mode read request processor, wherein the recovery mode write request processor is further adapted to mark the write LBA as storing stale data by adding information identifying the write LBA to the log memory, and wherein the recovery mode read request processor is further adapted to determine that the read LBA is marked as storing stale data by detecting that the read LBA matches information previously added in the log memory indicative that the read LBA stores stale data.

12. The apparatus of claim 11 wherein the log memory is a non-volatile memory device.

13. A Redundant Array of Independent Drives (RAID) storage system comprising:

a plurality of storage devices including a first device and a second device, wherein the first device is configured as part of a RAID logical volume comprising multiple storage devices of the plurality of storage devices; and a RAID storage controller coupled with the plurality of storage devices and coupled to receive read requests and write requests directed to access the RAID logical volume from host systems, wherein the first device is adapted to sense its failure and to generate a failure signal indicative of the failure, wherein the first device is further adapted to configure the first device into a recovery mode of operation responsive to sensing the failure, wherein the RAID storage controller is adapted to receive the failure signal from the first device indicating possible failure, wherein the RAID storage controller is further adapted to initiate a sequence of read requests to the first device to copy data from the first device to the second device in response to receipt of the failure signal while continuing to process read requests and write requests from the host systems, wherein the first device further comprises:

a recovery mode write request processor adapted to process a write request received from the RAID storage controller while the first device is in recovery mode, the write request identifying a write logical block address (LBA) to be written, the recovery write request processor adapted to mark the write LBA as storing stale data in response to receipt of the write request; and a recovery mode read request processor adapted to process a read request received from the RAID storage controller while the first device is in recovery mode, the read request identifying a read LBA to be read, the recovery read processor adapted to determine whether the read LBA is marked as storing stale data, the recovery read processor further adapted to complete the read request by returning requested data to the RAID storage controller in response to a determination that the read LBA does not store stale data, the recovery read request processor further adapted to complete the read request by returning to the RAID storage controller a stale data status indicating stale data in response to a determination that the read LBA is marked as storing stale data, and wherein the RAID storage controller is further adapted to rebuild data stored at the write LBA on the second device using data from corresponding blocks of other storage devices of the RAID logical volume in response to receipt of the stale data status.

14. The storage system of claim 13 wherein the recovery mode write processor is further adapted to mark the write LBA as storing stale data by writing uncorrectable data at the write LBA, and wherein the recovery mode read processor is further adapted to determine that the read LBA is marked as storing stale data by attempting to read the data stored at the read LBA and detecting the presence of uncorrectable data stored at the read LBA in response to the attempted read of the data.

15. The storage system of claim 14 wherein the recovery mode write request processor is further adapted to write uncorrectable data by processing the write request as though it is a SCSI WRITE_LONG operation having WR_UNCOR and COR_DIS parameters bits set.

16. The storage system of claim 13 wherein the first device further comprises:

a log memory coupled with the recovery mode write request processor and coupled with the recovery mode read request processor, wherein the recovery mode write request processor is further adapted to mark the write LBA as storing stale data by adding information identifying the write LBA to the log memory, and wherein the recovery mode read request processor is further adapted to determine that the read LBA stores stale data by detecting that the read LBA matches information previously added in the log memory indicative that the read LBA stores stale data.

17. The storage system of claim 16 wherein the log memory is a non-volatile memory device within the first device.

* * * * *